US010008131B2

(12) United States Patent
Dong et al.

(10) Patent No.: US 10,008,131 B2
(45) Date of Patent: Jun. 26, 2018

(54) OPHTHALMIC PROCEDURE SIMULATION WITH ARTIFICIAL EYE

(71) Applicant: NOVARTIS AG, Basel (CH)

(72) Inventors: Jeremy Dong, Aliso Viejo, CA (US); Ilya Goldshleger, Irvine, CA (US)

(73) Assignee: Novartis AG, Basel (CH)

( * ) Notice: Subject to any disclaimer, the term of this patent is extended or adjusted under 35 U.S.C. 154(b) by 763 days.

(21) Appl. No.: 14/584,781

(22) Filed: Dec. 29, 2014

(65) Prior Publication Data

US 2016/0189570 A1   Jun. 30, 2016

(51) Int. Cl.
*G09B 23/30* (2006.01)
*G09B 23/28* (2006.01)

(52) U.S. Cl.
CPC .......... *G09B 23/30* (2013.01); *G09B 23/286* (2013.01)

(58) Field of Classification Search
CPC ...... G09B 23/28; G09B 23/286; G09B 23/30; G09B 23/32
See application file for complete search history.

(56) References Cited

U.S. PATENT DOCUMENTS

| 2009/0004637 | A1* | 1/2009 | Carda | G09B 23/30 434/271 |
| 2017/0249871 | A1* | 8/2017 | Le | G09B 23/32 |

* cited by examiner

*Primary Examiner* — Timothy A Musselman
(74) *Attorney, Agent, or Firm* — S. Brannon Latimer

(57) ABSTRACT

An artificial eye can include a body defining a cavity; a lens element disposed within the cavity; a cornea element positioned anteriorly of the lens element; and a liquid disposed within the cavity such that the liquid is positioned between the lens element and the cornea element. A method of simulating an ophthalmic procedure can include providing an artificial eye positioned in an optical path of light transmitted by an ophthalmic device and at least one of calibrating the ophthalmic device using the artificial eye; and operating on the artificial eye using the ophthalmic device.

23 Claims, 6 Drawing Sheets

OPHTHALMIC PROCEDURE SIMULATION WITH ARTIFICIAL EYE

BACKGROUND

Technical Field

Embodiments disclosed herein are related to ophthalmic surgical and/or imaging devices. More specifically, embodiments described herein relate to an artificial eye that can be used to simulate ophthalmic surgical and/imaging procedures.

Related Art

Ophthalmic imaging systems, surgical laser systems, and other ophthalmic devices need to be calibrated before being used with an actual patient's eye. For example, the imaging quality of an optical coherence tomography (OCT) imaging system should be verified so that an OCT image depicts anatomical structures of the actual patient's eye in an appropriate manner. Demonstrations of the ophthalmic device, such as for training or advertising purposes, can also present circumstances when a human eye may not be available for use. For example, it may be desirable to demonstrate the incisions that can be made by a surgical laser system without using an actual patient.

Conventionally, different types of devices can be used to simulate ophthalmic procedures for calibration and/or demonstration purposes, including silicone eye phantoms and silicone gel targets. The silicone eye phantoms include multiple layers of silicone with varying thickness to simulate different portions of the human eye. The silicone layers can also include suspended nanopowder particles because silicone by itself does not scatter light in the same way that anatomy within the human eye does. While such silicone eye phantoms can be used to observe how light from the ophthalmic device is scattered, adjustment of system parameters based on this data is hindered because the nanopowder can clump within each layer or form a scattering gradient between the layers of the phantom. As a result, the light from the ophthalmic device can be scattered in a manner that does not realistically simulate the scattering of light in the human eye.

The silicone gel targets can have a fixed refractive index and can be used to calibrate the depth of anatomy in OCT imaging and/or surgical laser system demonstrations. The silicone gel targets do not have multiple layers, as the human eye does. Any mismatches in curvature of the anterior surface of the silicone gel target can affect the calibration of imaging depth and/or demonstration of cutting depth. Additionally, the silicone gel target can compress when the ophthalmic device contacts it. As a result, different depths can be measured when the silicone gel target is removed for analysis, limiting the utility of imaging depth calibration and/or cutting depth demonstration.

Ophthalmic device demonstrations that involve imaging and surgical procedures conventionally require both a silicone eye phantom and a silicone gel target. The silicone eye phantom can be used to demonstrate the imaging aspects of the procedure, while the silicone gel target can be used to demonstrate the incisions made by the surgical laser system. Switching the silicone eye phantom and the silicone gel target leads to inefficiencies. It also results in an unrealistic demonstration because the silicone gel target does not have varying anatomical structures and because silicone behaves differently when incised compared to human anatomy. Further, while some eye phantoms simulate aspects of the posterior segment of the eye, they do not simulate aspects of the anterior segment that can factor in the performance of ophthalmic devices.

Accordingly, there remains a need for improved devices, systems, and methods that improve the ability to calibrate ophthalmic devices and/or demonstrate ophthalmic procedures on the anterior segment of the eye by addressing one or more of the needs discussed above.

SUMMARY

The presented solution fills an unmet medical need with a unique solution to providing an artificial eye that models the anterior segment of the human eye. The artificial eye can be used for both calibrating and demonstrating the capabilities of ophthalmic imaging systems and/or surgical laser systems.

Consistent with some embodiments, an artificial eye is provided. The artificial eye can include a body defining a cavity; a lens element disposed within the cavity; a cornea element positioned anteriorly of the lens element; and a liquid disposed within the cavity such that the liquid is positioned between the lens element and the cornea element.

Consistent with some embodiments, a method of simulating an ophthalmic procedure is provided. The method can include providing an artificial eye positioned in an optical path of light transmitted by an ophthalmic device. The artificial eye can include a body defining a cavity; a lens element disposed within the cavity; a cornea element positioned anteriorly of the lens element; and a liquid disposed within the cavity such that the liquid is positioned between the lens element and the cornea element. The method can include at least one of calibrating the ophthalmic device using the artificial eye and operating on the artificial eye using the ophthalmic device.

Additional aspects, features, and advantages of the present disclosure will become apparent from the following detailed description.

Figure 1:
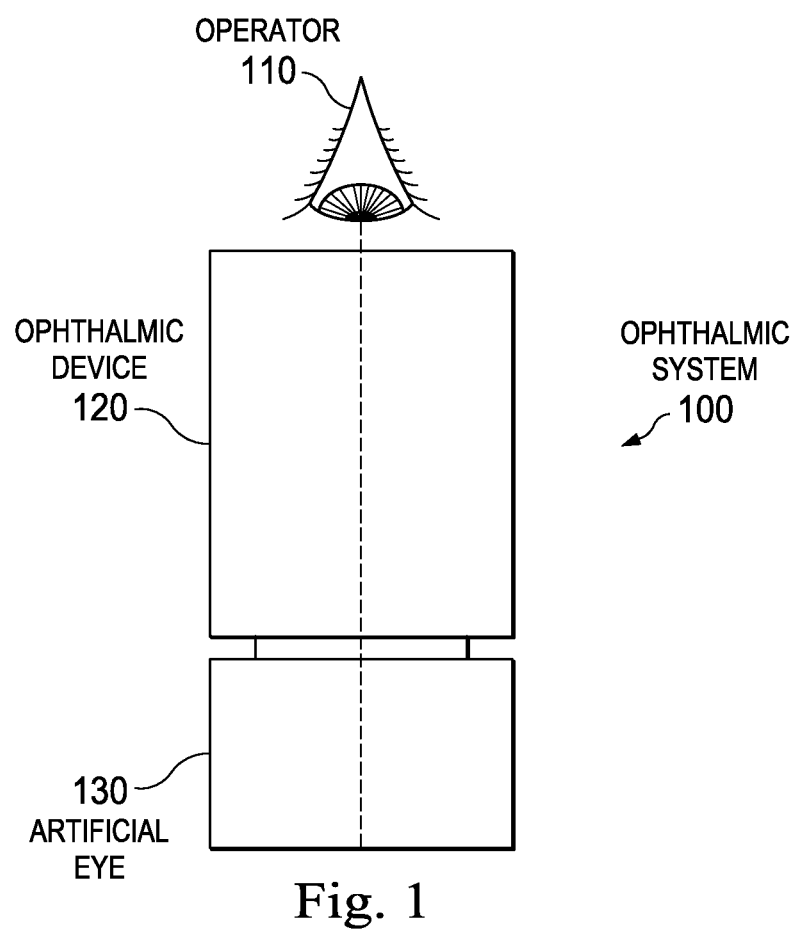
FIG. 1 is a diagram of an ophthalmic system.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art will realize other material that, although not specifically described herein, is within the scope and spirit of this disclosure.

The present disclosure describes devices, systems, and methods associated with an artificial eye that simulates the anterior segment of the human eye. The artificial eye can be removably coupled to an ophthalmic device that includes one or more of a surgical microscope, an OCT imaging system, a surgical laser system, etc. The artificial eye includes a cornea element and a lens element, formed of material(s) that mimic the physical properties (e.g., thickness, curvature, etc.) and optical properties (e.g., refractive index, light scattering, etc.) of the corresponding parts of the human eye. The cornea element and the lens element can be removed for physical inspection, such as after being cut with a surgical laser system, and replaced with new ones so that the artificial eye can be reused. The artificial eye can be used to simulate incisions made by the surgical laser system. The artificial eye can be filled with a liquid, such as saline, that bubbles when the eye is operated on by the surgical laser system, similar to how the aqueous humor in the human eye responds. The artificial eye can be used to calibrate a depth of incisions made by the surgical laser system or a depth of anatomy in images generated by the imaging system, such as an OCT imaging system. The artificial eye can also be used to improve the quality of images generated by the imaging system by identifying any optical distortions caused by the imaging system.

The devices, systems, and methods of the present disclosure provide numerous advantages, including: (1) modeling the full anterior segment of the human eye; (2) providing the ability to calibrate and demonstrate imaging and surgical systems using a single device; (3) realistically modeling optical and physical properties of the human eye; and (4) realistically simulating the response of the human eye during imaging and/or surgical procedures, including generating bubbles in response to photocoagulation.

FIG. 1 illustrates an ophthalmic system 100. The ophthalmic system 100 can include an ophthalmic device 120 and an artificial eye 130. Embodiments of the artificial eye 130 are described in greater detail with respect to FIGS. 2-5. The ophthalmic device 120 can include one or more of a diagnostic device and treatment device. For example, the ophthalmic device 120 can be a surgical microscope that an operator 110 uses to directly visualize the artificial eye 130. The operator 110 can include a medical professional, such as a surgeon, or a representative of the manufacturer of the ophthalmic device 120 who is authorized to demonstrate the capabilities of the ophthalmic device 120. The surgical microscope can receive light reflected from the artificial eye 130. In that regard, the surgical microscope can include one or more lenses, such as focusing lens(es), zoom lens(es), and an objective lens, as well as mirrors, filters, gratings, and/or other optical components that comprise an optical train.

The ophthalmic device 120 can include a video microscope. In that regard, the ophthalmic device 120 can include an imaging component, such as a camera, that receives light reflected from the artificial eye 130 and generates still or live images of the artificial eye 130. The operator 110 can view the images on a display device communicatively coupled to the ophthalmic device 120. The video microscope can include a processing component that executes one or more software modules that can, among other features, automatically identify anatomy within the artificial eye 130, provide graphical overlays on the images generated by the camera, etc.

The ophthalmic device 120 can include a diagnostic imaging system, such as an OCT imaging system, a multi-spectral imaging system, a fluorescence imaging system, and a photo-acoustic imaging system. In that regard, the diagnostic imaging system can scan the artificial eye 130 with a light beam. For example, the light beam can be part of an OCT scanning beam. The light beam an operating wavelength in the 0.2-1.8 micron range, the 0.7-1.4 micron range, and/or the 0.9-1.1 micron range. The OCT system can be configured to split an imaging light received from a light source into an imaging beam that is directed onto target biological tissue and a reference beam that can be directed onto a reference mirror. The OCT system can be a Fourier domain (e.g., spectral domain, swept-source, etc.) or a time domain system. The OCT system can be further configured to receive the imaging light reflected from the target biological tissue. The interference pattern between the reflected imaging light and the reference beam can be utilized to generate images of the target biological tissue. Accordingly, the OCT system can include a detector configured to detect the interference pattern. The detector can include Charge-Coupled Detectors (CCDs), pixels, or an array of any other type of sensor(s) that generate an electric signal based on detected light. Further, the detector can include a two-dimensional sensor array and a detector camera. A computing device can process the data acquired by the OCT system to generate a two-dimensional or three-dimensional OCT image. The OCT system can be used to image one or more components of the artificial eye 130.

The ophthalmic device 120 can include a surgical laser system, such as a cataract surgical system and/or a refractive surgical system. For example, the ophthalmic device 120 can be the LenSx® Laser System available from Alcon, Inc. In that regard, the surgical laser system can use a laser beam to make incisions in the artificial eye 130 for corneal incision, capsulotomy, lens fragmentation, etc. For example, the laser beam can be a femtosecond laser beam, an excimer laser beam, or other suitable laser beam.

The ophthalmic device 120 can be a standalone device, such a surgical laser system, an OCT imaging system, etc. The ophthalmic device 120 can include a multi-component device. For example, the ophthalmic device 120 can include any combination of the components described above, such as a microscope-integrated OCT imaging system, a microscope-integrated surgical laser system, a surgical laser system with an integrated video microscope and/or OCT imaging system, etc.

The artificial eye 130 is configured to have a defined optical/optomechanical relationship to the ophthalmic device 120. For example, the artificial eye 130 can be removably coupled to the ophthalmic device 120. In the embodiment of FIG. 1, the artificial eye 130 can be coupled directly to the ophthalmic device 120. In other embodiments, one or more components can be disposed between the artificial eye 130 and the ophthalmic device 120 such that that the artificial eye 130 is directly coupled to the intermediary component(s) and indirectly coupled to the ophthalmic device 120. The intermediary component can be a patient interface that extends from the ophthalmic device 120 and is configured to contact the artificial eye 130. For example, the LenSx® Laser SoftFit™ Patient Interface can be disposed between the artificial eye 130 and the ophthalmic device 120.

FIGS. 2-5 illustrate cross-sectional views of the artificial eye 130. The artificial eye 130 can include a body 132. The body 132 can define a cavity 134. The artificial eye 130 can include a lens element 136 disposed within the cavity 134. The artificial eye 130 can include a cornea element 138 positioned anteriorly of the lens element 136. The artificial eye 130 can include a liquid disposed within the cavity 134 such that the liquid is positioned between the lens element 136 and the cornea element 138.

The body 132 can be formed of a metal, a plastic, other suitable material, or combinations thereof. The body 132 can be partially or substantially shaped as a cylinder, other suitable geometrical or non-geometrical shapes, and/or combination thereof. In that regard, an interior of the body 132 can be sized and shaped such that it resembles an interior of a human eye even if the exterior of the artificial eye 130 does not resemble a human eye. For example, the interior of the body 132 can realistically simulate an interior of the human eye when viewed with a surgical microscope or video microscope, or when imaged by the OCT system.

The body 132 can define the cavity 134 configured to be filled with the liquid. The cavity 134 can simulate the anterior chamber of the human eye that is filled with aqueous humor. The liquid within the cavity 132 can be any clear liquid (e.g., without suspended particles) that has an index of refraction similar that of the aqueous humor. For example, the liquid can be saline, balanced salt solution (BBS), balanced salt solution plus (BSS Plus), water, other suitable liquids, and/or combinations thereof. In general, the liquid within the cavity 132 can be any clear liquid with a known index of refraction. The known index of refraction can be used to carry out any computations necessary for calibrating, e.g., OCT imaging quality, laser cutting depth, etc. The liquid contacts at least a portion of the lens element 138 and at least a portion of the cornea element 136. Cavitation bubbles can be generated by the liquid when the lens element 138 and/or the cornea element 136 are incised with the surgical laser system, in a similar manner as bubbles are formed in the aqueous humor.

The material(s) of the cornea element 138 and the lens element 136 can be selected to match the optical and/or physical properties of the corresponding part of the human eye. In various embodiments, the material(s) can include hydrogel, silicone, glass, clear plastic, other suitable materials, and/or combinations thereof. For example, material(s) can include Benz R&D Hioxifilcon-B (hydrogel), Contamac Methafilcon-B (hydrogel), PMMA (plastic), Nu-Sil LS 1-6140 (clear silicone), and/or Q-Sil 216 (clear silicone). Hydrogel can be utilized, for example, when the liquid is positioned between the lens element 136 and the cornea element 138. Silicone can be utilized when the cornea element 138 and/or the lens element 136 will be exposed to the ambient environment. The material can include one or more types of suspended medium, such as titanium oxide nanopowder, alumina powder/nanopowder, other suitable materials, and/or combinations thereof. The cornea element 138 and the lens element 136 can comprise the same material(s) or different material(s).

The material(s) of the cornea element 138 and the lens element 136 can be selected match the light scattering properties, the refractive index, and/or other optical properties of the human cornea and the human lens, respectively. As a result, when the artificial eye is scanned by an OCT scanning beam, the cornea element 138 and/or the lens element 136 can interact with the OCT scanning beam in a similar manner as the human cornea and/or the human lens would. Thus, the OCT image of the artificial eye 130 can realistically resembles an OCT image of a human eye.

The cornea element 138 and the lens element 136 can be sized and shaped to match an average radius of curvature, average thickness, and/or other physical properties of the human cornea and the human lens, respectively. For example, the lens element 136 can biconvex-shaped, similar to the human lens. In various embodiments, physical properties of the cornea element 138 and the lens elements 138 can be representative of a particular subset of a population (e.g., those with a particular ophthalmic condition that causes the physical properties to deviate from the average). Generally, any condition can be simulated, including nearsightedness, farsightedness, astigmatism, cataracts, presbyopia, keratoconus, among others. When an incision is made in the cornea element 138 and/or the lens element 136, the physical response of the cornea element 138 and/or the lens element 136 can realistically simulates the physical response of the human cornea and/or the human lens.

The artificial eye 130 can include an attachment element 140 that is configured to removably couple the artificial eye 130 to the ophthalmic device 120. The portion of the attachment element 140 shown in FIGS. 2-5 is configured to be removably coupled to the body 132. The attachment element 140 can be press fit, slip fit, compression fit, interference fit, or otherwise engagingly coupled with the body 132. For example, the attachment element 140 and the body 132 can include corresponding threads and grooves for coupling the attachment element 140 and the body 132. Another portion of the attachment element 140 is configured to be removably coupled to the ophthalmic device 120. For example, the attachment element 140 can be coupled to an objective lens or other focusing component of the ophthalmic device 120. In the illustrated embodiment, the attachment element 140 can be partially conically shaped, though in other embodiments, the attachment element 140 can have other suitable shapes. In that regard, the attachment element 140 can variously include one or more of a suspension system, a mechanical frame, a protruding arm, a conical structure, a magnetic member, an elastic member, and a plastic member.

Figure 3:
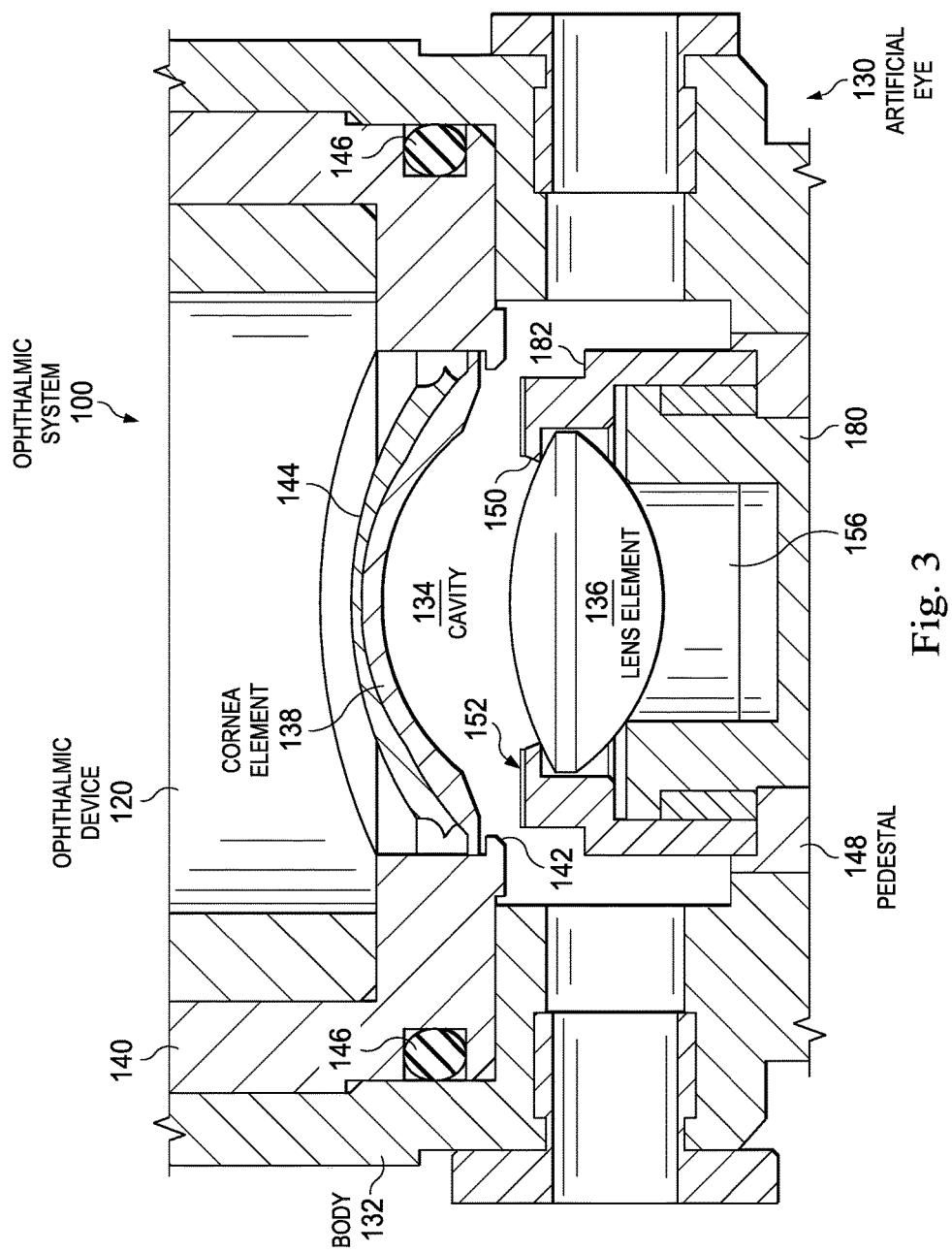
FIG. 3 is a diagrammatic cross-sectional view of a portion of an artificial eye.

The artificial eye 130 can include a contact element 144 configured to contact the cornea element 138. The contact element 144 can be formed of one or materials, including glass, plastic, water, other suitable materials, and/or combinations thereof. The contact element 144 can be part of the optical train of the ophthalmic device 120. For example, as illustrated in FIG. 3, the contact element 144 can be the last component between the ophthalmic device 120 and the cornea element 146. In various embodiments, the contact element 144 can be releasably or fixedly coupled to the attachment element 140. For example, the contact element 144 can be affixed within the attachment element 140 using an adhesive. In other embodiments, one or both of the contact element 144 and/or the attachment element 140 can include mechanical structures (e.g., projection/groove, lip, ledge, etc.) that releasably couple the components to one another.

In the embodiment of FIGS. 2-5, the attachment element 140 and the contact element 144 together can be considered a patient interface. As described above with respect to FIG. 1, in some embodiments, a separate patient interface can be provided between the artificial eye 130 and the ophthalmic device 120. In such embodiments, the separate patient interface can contact the cornea element 138, and the artificial eye 130 may not include the attachment element 140 and/or the contact element 144.

The contact element 144 can be coupled to the cornea element 138 in a manner that simulates the view of the anterior segment of the human eye the surgeon would have when using a surgical microscope. In various embodiments, the attachment element 140, the contact element 144, and/or the coupling between the contact element 144 and the cornea element 138 can be modified and/or removed. For example, the positioning of the artificial eye 130 and the ophthalmic device 120 can be optimized for a standalone OCT imaging system, a standalone surgical laser system, etc. The contact element 144 can be removed to simulate an ophthalmic device 120 that does not utilize a contact lens/patient interface. For example, the artificial eye 130 can be placed in a saline or water bath to simulate use of an ophthalmic device 120 that relies on a liquid/patient interface.

The attachment element 140 can include an engagement feature 142 configured to releasably retain the cornea element 138 within the attachment element 140. The engagement feature 142 can be a mechanical structure that prevents the cornea element 138 from becoming uncoupled from the attachment element 140 during ordinary use of the artificial eye 130 to calibrate the ophthalmic device 120 and/or to demonstrate a surgical procedure with the ophthalmic device 120. However, as described in greater detail with respect to FIG. 6, the engagement feature 142 can also be configured such that the cornea element 138 can be removed by the operator 110 when desired (e.g., after one surgical procedure simulation is complete) and a further cornea element inserted (e.g., for another surgical procedure simulation). The engagement feature 142 can hold the cornea element 138 against the contact element 144 based on a tight fit between the components as well as surface tension between the cornea element 138 and the contact element 144.

The engagement feature 142 can be disposed wholly or partially around a perimeter of the cornea element 138. In the illustrated embodiment, the engagement feature 142 includes a ledge or a lip that extends from the attachment element 140. The cornea element 138 can be seated along the engagement feature 142. The engagement features 142 can take other forms. For example, the engagement feature 142 can includes groove or slot that receives a portion of the cornea element 138. In various embodiments, the cornea element 138 can be removably coupled to the body 130 directly. For example, the engagement feature 142 can be disposed on the body 130 to releasably retain the cornea element 138 within the body 130.

The artificial eye 130 can include a pedestal 148 that is movable to simulate deep and shallow anterior chambers of the human eye. The pedestal 148 and the body 132 can include corresponding mechanical structures 158 and 160, such as projection(s) and channel(s), threads and grooves, etc., that permit the pedestal 148 to move up and down relative to the body 132. The lens element 136 can be disposed on the pedestal 148. When the pedestal 148 is moved relative to the body 132, the lens element 136 can be moved relative to the cornea element 138. Movement of the pedestal 148 also increases or decreases the volume of the cavity 134 and the liquid positioned between the lens element 136 and the cornea element 146.

The pedestal 148 can includes an engagement feature 150 to releasably retain the lens element 136 within the pedestal 148. The engagement feature 150 can be a mechanical structure that prevents the lens element 136 from becoming uncoupled from the pedestal 148 during ordinary use of the artificial eye 130 to calibrate the ophthalmic device 120 and/or to demonstrate a surgical procedure with the ophthalmic device 120. However, as described in greater detail with respect to FIG. 6, the engagement feature 150 can also be configured such that the lens element 136 can be removed by the operator 110 when desired (e.g., after one surgical procedure simulation is complete) and a further lens element inserted (e.g., for another surgical procedure simulation). The engagement feature 150 can be disposed wholly or partially around a perimeter of the lens element 136. In the illustrated embodiment, the engagement feature 150 includes a ledge or a lip that extends from the pedestal 148. The lens element 136 can be positioned adjacent to the engagement feature 150. The engagement feature 150 can take other forms. For example, the engagement feature 150 can include groove or slot that receives a portion of the lens element 136. In various embodiments, the lens element 136 can be removably coupled to the body 130 directly. For example, the engagement feature 150 can be disposed on the body 130 to releasably retain the lens element 136 within the body 130.

Figure 2:
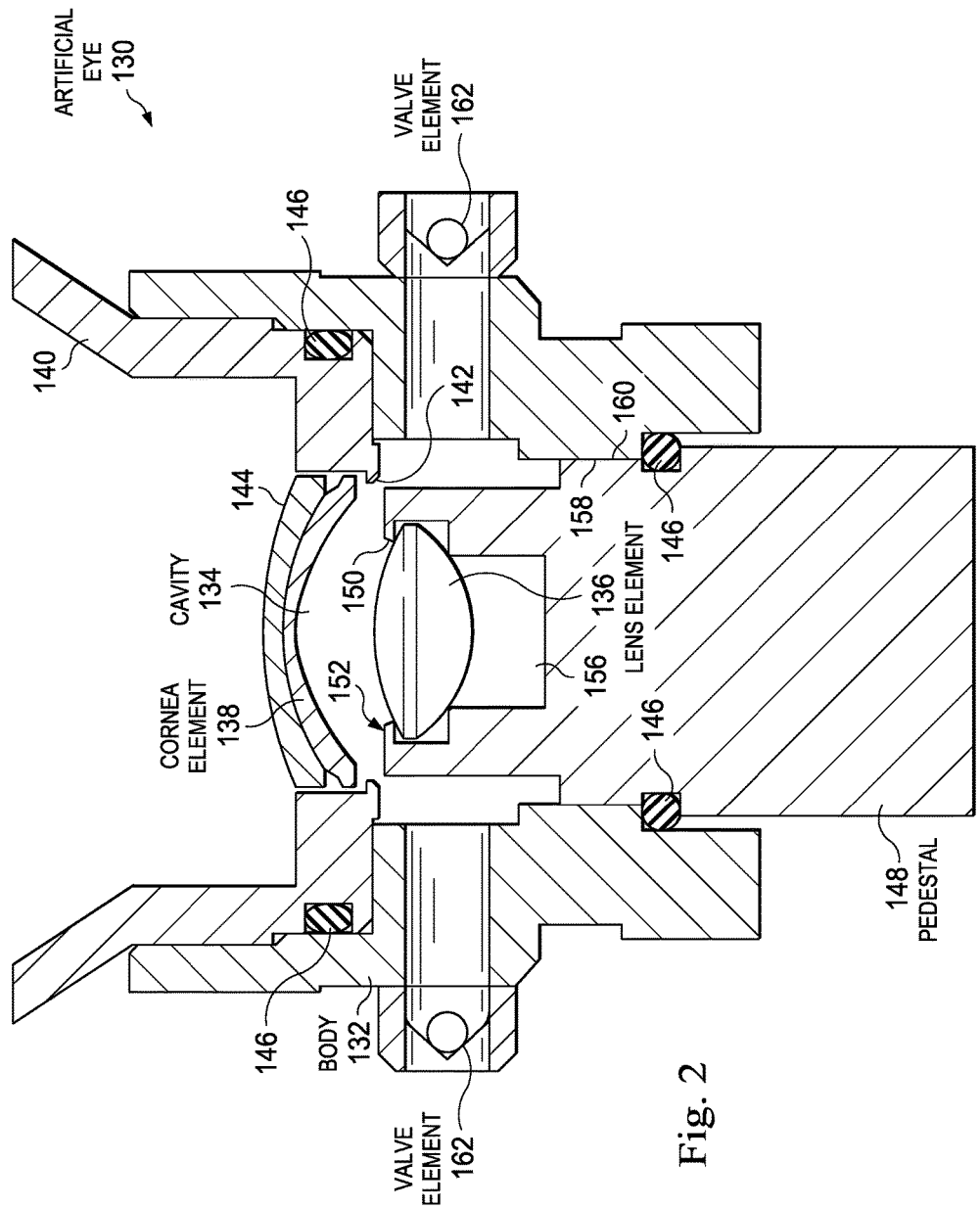
FIG. 2 is a diagrammatic cross-sectional view of an artificial eye.
Figure 4:
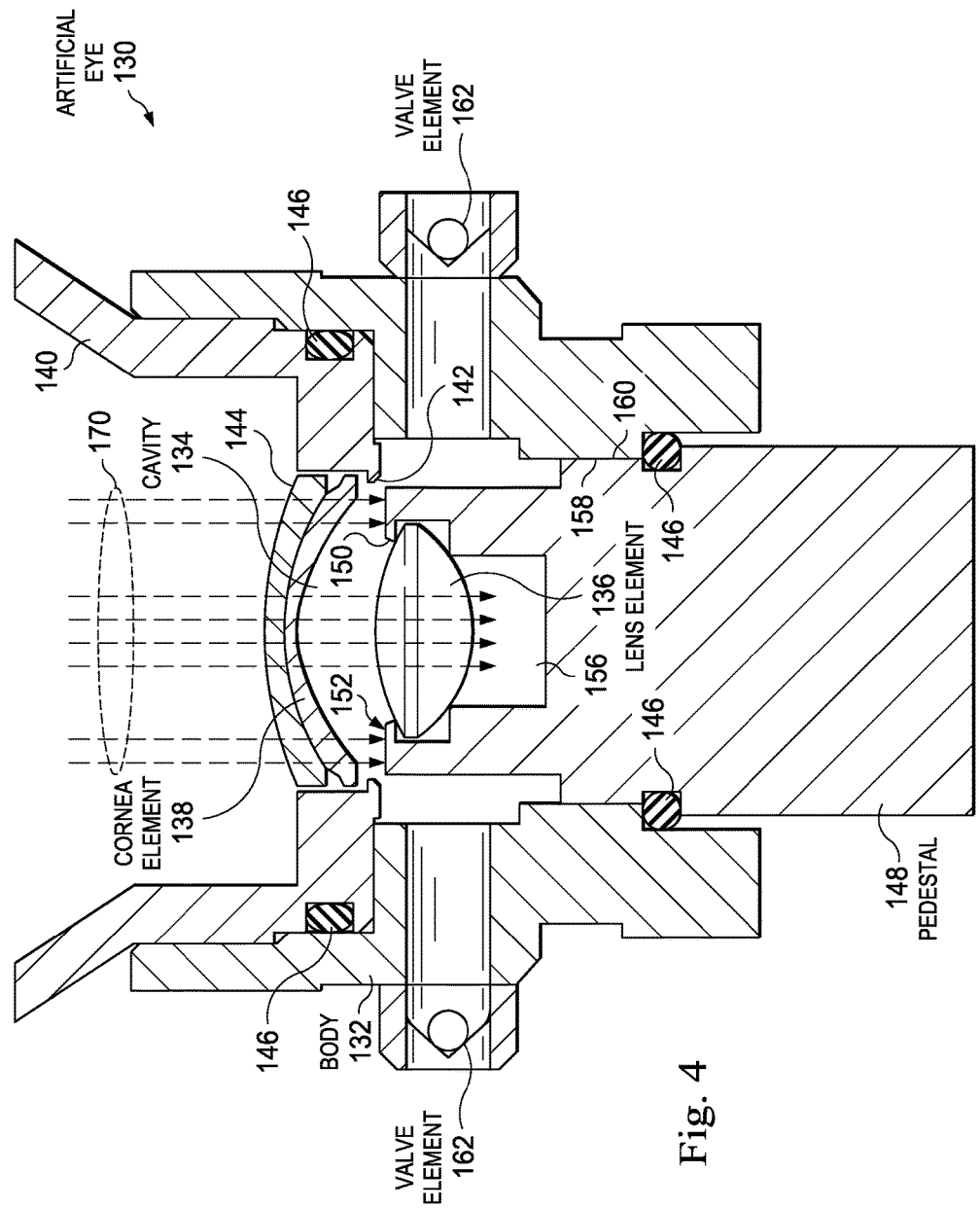
FIG. 4 is a diagrammatic cross-sectional view of a portion of an artificial eye.
Figure 5:
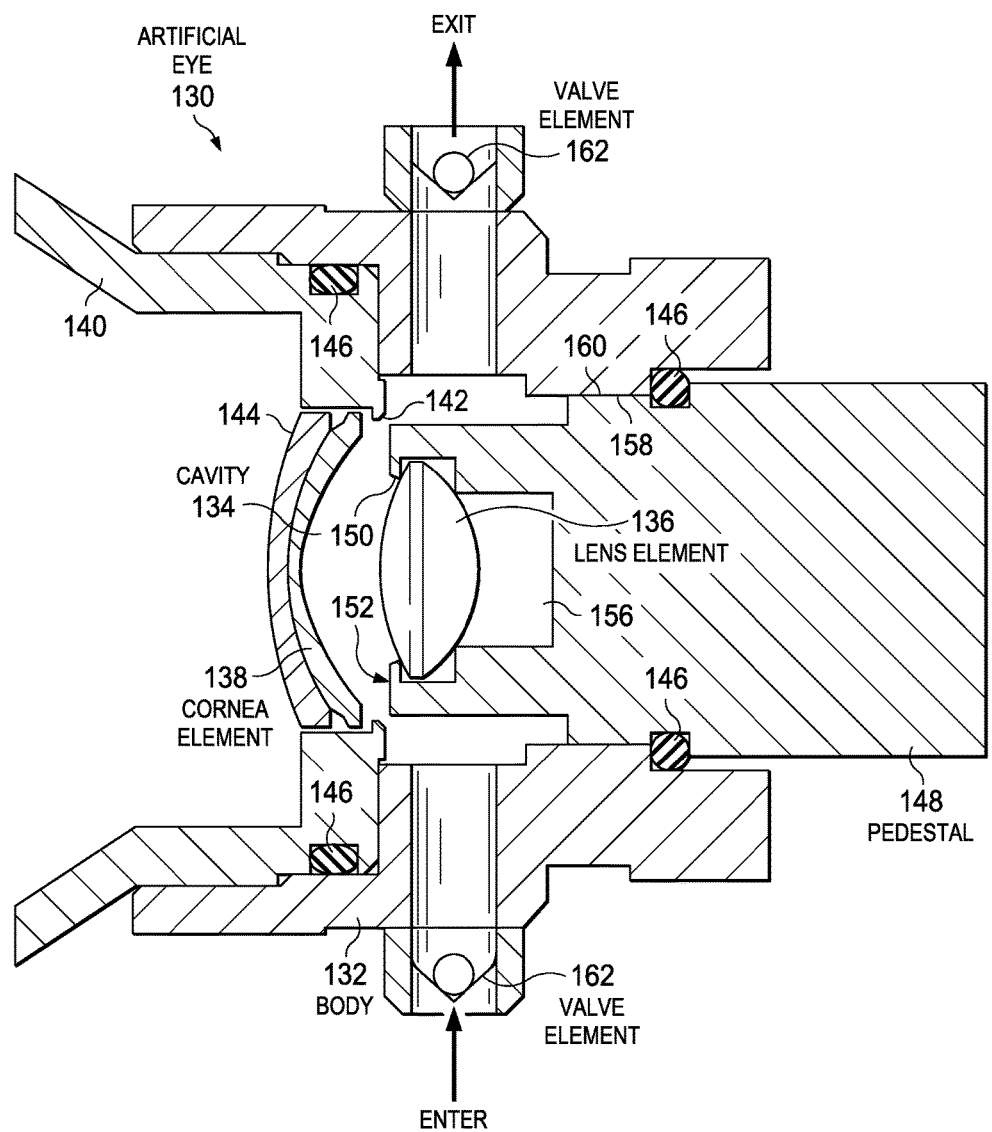
FIG. 5 is a diagrammatic cross-sectional view of a portion of an artificial eye.

The pedestal 148 can be a unitary component, as shown in FIGS. 2, 4, and 5. The pedestal 148 can include a movable portion 180 and an iris portion 182, as shown in FIG. 3. The iris portion 182 can be removably coupled to the movable portion 180 via, e.g., corresponding threads and grooves. The movable portion 180 can include a contact feature that maintains the lens element 136 in an aligned or centered configuration with respect to the cornea element 138. The iris portion 182 can include the engagement feature 150, and when coupled to the movable portion 180, can keep the lens element 136 captive within the pedestal 148.

Referring again to FIGS. 2-4, the artificial eye includes an iris element 152. The iris element 152 can refer to an anterior surface of the pedestal 148 and/or the iris portion 182. The iris element 152 can be opaque. As illustrated in FIG. 4, light 170 from the ophthalmic device 120 can be blocked by the iris element 152 while the light 170 is transmitted through the lens element 136. An image of a human iris and/or the transition between limbus/sclera can be provided on the iris element 152. By including anatomy that the operator 110 would see when observing the human eye, the artificial eye 130 can thus provide a realistic view for the operator 110, when the artificial eye 130 is observed through a surgical microscope or a video microscope. Additionally, the cornea element 138, the lens element 136, and the iris element 152 can realistically represent the human eye such that software within the ophthalmic device 120, such as software for auto focusing, automatic identification of anatomical structures, etc., functions as it would for the natural human eye.

A cavity 156 can be disposed posteriorly of the lens element 136. The cavity 156 is configured to be filled with the liquid that fills the cavity 134. In that regard, the cavity 156 can be in fluid communication with the cavity 134. The cavity 156 can simulate the posterior chamber of the human eye, which is filled with vitreous humor. The pedestal 148 can include orifices that allow the liquid to fill the cavity 156 when the liquid is introduced into the cavity 134 of the artificial eye 130. By simulating the posterior chamber of the human eye, the cavity 156 can provide additional familiarity for the operator 110 when viewing the artificial eye 130. The cavity 156 can be visible in an OCT image of the artificial eye 130 when the range of the OCT scanning beam is sufficient to reach the depth of the cavity 156.

Sealing elements 146 can be disposed between the body 132 and the attachment element 140, as well as between the body 132 and the pedestal 148. The sealing elements 146 can be any suitable O-ring, seal, packing, or gasket. For example, the sealing elements 146 illustrated in FIGS. 2-5 include O-rings with circular cross-sections. The sealing elements 146 are configured to hermetically seal the cavity 134 when the sealing elements 146 are compressed between the body 132, the attachment element 140, and/or the pedestal 148. As a result, the lens elements 136 and the cornea element 138 are not exposed to the ambient environment, and the liquid within the cavity 134 does not leak.

The body 132 can include valve elements 162 configured to fill and/or evacuate the cavity 134 of the liquid. The valve elements 162 can include any suitable return or non-return valve. The valve element 162 can also be a soft membrane and/or other suitable access mechanism for the cavity 134. In the embodiment of FIG. 5, the valves elements 162 include one-way check valves. That is, the valve elements 162 can be configured to allow flow of liquid in the direction indicated by the arrows. In that regard, the valve elements 162 can be described as an enter valve element or an exit valve element. One valve element 162 can be used for filling the cavity 134, and the other valve element 162 can be used for draining the cavity 134. The liquid can be introduced through the enter check valve 162. Any suitable method of filling the cavity 134 can be used. For example, the liquid can be injected into cavity 134 using a syringe with a luer attachment or a loading syringe and/or needle. As another example, the liquid can be introduced into the cavity 134 through the soft membrane used in conjunction with the loading syringe and/or needle. The cavity 134 can be filled until excess liquid drains from the exit valve element 162. The volume of liquid within the artificial eye 130 can be between about 0.5 ml and about 3.0 ml, between about 1.0 ml and about 2.5 ml, between about 1.0 ml and about 2.0 ml, including values such as about 1.25 ml, about 1.5 ml, about 1.75 ml, and about 2.0 ml.

The artificial eye 130 can be rotated such that it is on its side when the cavity 134 is filled. In this orientation, unwanted air bubbles will float towards the exit valve element 162 and be purged therethrough such that no air bubbles are present in the cavity 134. Any excess pressure within the artificial eye 130 can also be vented through exit check valve 162. The direction of the arrows and the orientation of the artificial eye in FIG. 5 are exemplary. It is understood that either of the valve elements 162 can be the enter check valve and the exit check valve, such that the direction of the arrows and the orientation of the artificial eye can be switched.

Figure 6:
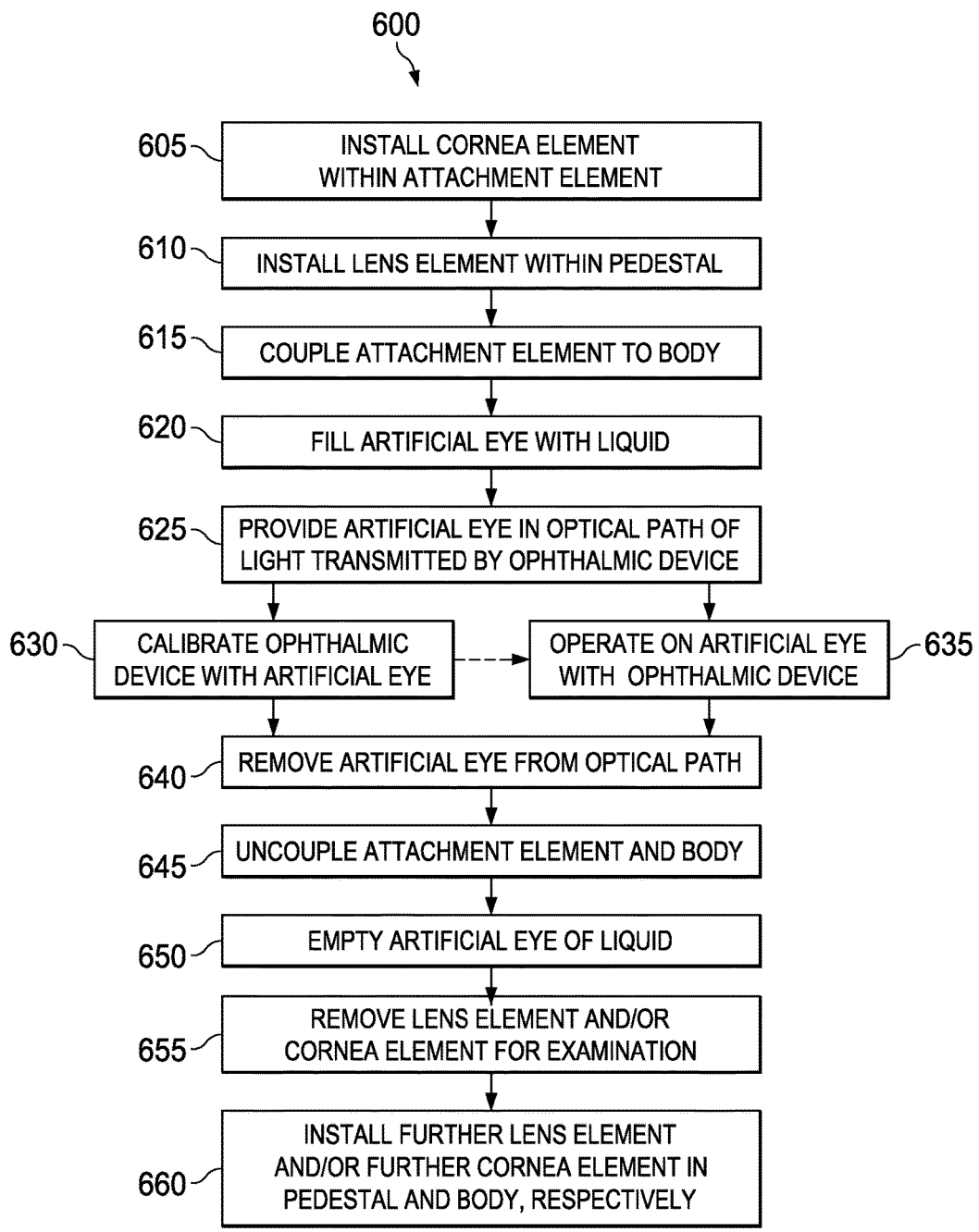
FIG. 6 is a flow diagram of a method of simulating an ophthalmic procedure.

FIG. 6 illustrates a flow diagram of a method 600 of simulating an ophthalmic procedure. The method 600 can be better understood with references to FIGS. 1-5. As illustrated, the method 600 includes a number of enumerated steps, but embodiments of the method 600 may include additional steps before, after, and in between the enumerated steps. In some embodiments, one or more of the enumerated steps may be combined, omitted, or performed in a different order.

The method 600 can include, at step 605, installing the cornea element 138 within the attachment element 140. For example, the cornea element 138 can be positioned adjacent to the contact element 144 such that the perimeter of the cornea element 138 is seated along the engagement feature 142. The method 600 can include, at step 610, installing the lens element 136 within the pedestal 148. For example, the lens element 136 can be positioned within the pedestal 148 such that it is retained by the engagement feature 150. For example, the iris portion 182 can be uncoupled from the movable portion 182. The lens element 136 can be positioned on the contact feature of the movable portion 182 that centers the lens element 136. The iris portion 182 can be recoupled to the movable portion 182 such that the engagement feature 150 retains the lens element 136 within the pedestal 148.

The method 600 can include, at step 615, coupling the attachment element 140 to the body 132. As a result, the artificial eye 130 can be assembled with the lens element 136 and the cornea element 138 contained therein. The method 600 can include, at step 620, filling the artificial eye 130 with the liquid. For example, as described with respect to FIG. 5, the artificial eye 130 can be rotated onto its side, and the liquid can be injected into the artificial eye 130 through the enter valve element 162. The method 600 can include, at step 625, providing the artificial eye 130 in an optical path of light transmitted by the ophthalmic device 120. For example, the artificial eye 130 can be coupled to the ophthalmic device 120 such that the imaging light beam or the surgical laser beam transmitted by the ophthalmic device 120 is received at the artificial eye 130. Light reflected from the artificial eye 130 can also be received at the ophthalmic device 120. The artificial eye 130 can be coupled to the ophthalmic device 120 using, e.g., the attachment element 140.

The method 600 can include, at step 630, calibrating the ophthalmic device 120 with the artificial eye 130. For example, calibrating the ophthalmic device 120 can include calibrating image characteristics of OCT images generated by the OCT system, such identifying or otherwise characterizing optical distortions caused by the OCT system. For example, calibrating the ophthalmic device 120 can include calibrating a depth of anatomy, such as the lens element 136 and the cornea element 138, in OCT images generated by the OCT system or incised by the surgical laser system. Calibrating the ophthalmic device 120 can include adjusting system parameters of the ophthalmic device 120 such that the ophthalmic device 120 images and/or cuts the lens element 136 and the cornea element 138 in an expected manner. For example, the system parameters can be adjusted such that the depth of anatomy in images generated by the ophthalmic device 120 or the depth of incisions made by the ophthalmic device 120 match the depth that the operator 110 intended.

The method 600 can include, at step 640, operating on the artificial eye 130 with the ophthalmic device 120. Operating on the artificial eye 130 can include making incisions in the lens element 136 and/or the cornea element 138 to simulate corneal incision, capsulotomy, lens fragmentation, etc. For example, the surgical laser system can apply a laser pulse to the lens element 136 and/or the cornea element 138 such that bubbles are formed in the liquid disposed in the artificial eye 130. The artificial eye 130 thus more accurately simulates a surgical procedure on the human eye. Step 640 can occur in addition to or in lieu of step 630 in various embodiments. For example, the ophthalmic device 120 can be first calibrated with artificial eye 130 and then incisions can be made in the artificial eye 130. Calibrating the ophthalmic device 120 can include making incisions in the artificial eye 130.

The method 600 can include, at step 640, removing the artificial eye 130 from the optical path of the ophthalmic device 120. For example, the attachment element 140 can be uncoupled from the ophthalmic device 120, which uncouples the artificial eye 130 from the ophthalmic device 120. The method 600 can include, at step 645, uncoupling the attachment element 140 and the body 132. The method 600 can include, at step 650, emptying the artificial eye 130 of the liquid inside the cavity 134. For example, the liquid can be removed by rotating the body 132 such that the liquid flows out through the portion of the artificial eye 130 previously occupied by the attachment element 140, introducing pressurized air through the enter valve element 162, and/or other suitable methods. The method 600 can include, at step 655, removing the lens element 136 from the pedestal 148 and/or removing the cornea element 138 from the attachment element 140. For example, removing the lens element 136 can include first uncoupling the iris portion 182 and the movable portion 180, and then removing the lens element 136 from the movable portion 180. The removed cornea element 138 and/or the lens element 136 can be examined after removal from the artificial eye 130. For example, the quality, depth, type, and other characteristics of the incisions made by the surgical laser system can be inspected to demonstrate how the surgical laser system will behave with the human eye. The method 600 can include, at step 660, installing a further lens element and/or a further cornea element in the pedestal 148 and/or the attachment element 140, respectively. Thus, the artificial eye 130 can be reused for additional calibration and/or demonstration procedures.

Embodiments as described herein can provide devices, systems, and methods that facilitate simulation of ophthalmic imaging and/or surgical procedures using an artificial eye. The devices, systems, and methods described herein realistically recreate the anatomy of the human eye such that surgical imaging systems and surgical laser systems behave similarly with the artificial eye as they do with the human eye. The examples provided above are exemplary only and are not intended to be limiting. One skilled in the art may readily devise other systems consistent with the disclosed embodiments which are intended to be within the scope of this disclosure. As such, the application is limited only by the following claims.

The invention claimed is:

1. An artificial eye, comprising:
a body defining a cavity;
a lens element disposed within the cavity;
a cornea element positioned anteriorly of the lens element;
a liquid disposed within the cavity such that the liquid is positioned between the lens element and the cornea element; and
an attachment element coupled to the body, the attachment element configured to removably couple the body to an ophthalmic device.

2. The artificial eye of claim 1, wherein:
the cornea element comprises a material selected to match at least one of the light scattering properties and the refractive index of a human cornea.

3. The artificial eye of claim 2, wherein: the material includes at least one of hydrogel, silicone, glass, and clear plastic.

4. The artificial eye of claim 1, wherein:
the attachment element includes an engagement feature to releasably retain the cornea element within the attachment element.

5. The artificial eye of claim 1, further comprising:
a contact element coupled to the attachment element and disposed anteriorly of the cornea element.

6. The artificial eye of claim 1, further comprising:
a sealing element disposed between the attachment element and the body.

7. The artificial eye of claim 1, wherein:
the lens element comprises a material selected to match at least one of the light scattering properties and the refractive index of a human lens.

8. The artificial eye of claim 7, wherein:
the second material includes at least one of hydrogel, silicone, glass, and clear plastic.

9. The artificial eye of claim 1, wherein:
the lens element is coupled to a pedestal, wherein the pedestal is selectively movable relative to the body to selectively move the lens element relative to the cornea element.

10. The artificial eye of claim 9, wherein:
the pedestal includes an engagement feature to releasably retain the lens element within the pedestal.

11. The artificial eye of claim 9, further comprising:
a sealing element disposed between the pedestal and the body.

12. The artificial eye of claim 10, further comprising:
an iris image disposed on an anterior surface of the engagement feature.

13. The artificial eye of claim 1, further comprising:
a valve element configured to allow the liquid to flow into or out of the cavity.

14. The artificial eye of claim 13, wherein the valve element includes at least one of:
a check valve and a soft membrane.

15. A method of simulating an ophthalmic procedure, comprising:
providing an artificial eye positioned in an optical path of light transmitted by an ophthalmic device, the artificial eye comprising
a body defining a cavity;
a lens element disposed within the cavity;
a cornea element positioned anteriorly of the lens element;
a liquid disposed within the cavity such that the liquid is positioned between the lens element and the cornea element; and
an attachment element coupled to the body, the attachment element configured to removably couple the body to the ophthalmic device; and
at least one of calibrating the ophthalmic device using the artificial eye; and operating on the artificial eye using the ophthalmic device.

16. The method of claim 15, wherein calibrating the ophthalmic device includes:
calibrating an optical coherence tomography (OCT) system.

17. The method of claim 16, wherein calibrating the ophthalmic device includes:
calibrating image characteristics of OCT images generated by the OCT system.

18. The method of claim 16, wherein calibrating the ophthalmic device includes:
calibrating a depth of anatomy in OCT images generated by the OCT system.

19. The method of claim 15, wherein operating on the artificial eye includes:
operating on the artificial eye using a laser system.

20. The method of claim 19, wherein operating on the artificial eye includes:
making an incision in at least one of the lens element and the cornea element using the laser system.

21. The method of claim 20, wherein making an incision includes:
applying a laser pulse to at least one of the lens element and the cornea element such that bubbles are formed in the liquid.

22. The method of claim 20, further comprising:
removing at least one of the lens element and the cornea element from the artificial eye after the incision has been made such that the at least one of the lens element and the cornea element can be examined.

23. The method of claim 22, further comprising:
installing at least one of a further lens element and a further cornea element in the artificial eye after removing the at least one of the lens element and the cornea element.

* * * * *